United States Patent
Christensson et al.

(10) Patent No.: US 10,091,737 B2
(45) Date of Patent: Oct. 2, 2018

(54) METHOD AND MEANS FOR MAINTAINING UPLINK TIME ALIGNMENT

(71) Applicant: Telefonaktiebolaget LM Ericsson (publ), Stockholm (SE)

(72) Inventors: Anders Christensson, Älvsjö (SE); Franz Heiser, Järfälla (SE); Fredrik Huss, Sundbyberg (SE); Lars Klockar, Rättvik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 15/102,307

(22) PCT Filed: Dec. 20, 2013

(86) PCT No.: PCT/SE2013/051613
§ 371 (c)(1),
(2) Date: Jun. 7, 2016

(87) PCT Pub. No.: WO2015/094075
PCT Pub. Date: Jun. 25, 2015

(65) Prior Publication Data
US 2017/0034786 A1    Feb. 2, 2017

(51) Int. Cl.
| | | |
|---|---|---|
| H04L 1/00 | (2006.01) | |
| H04W 52/14 | (2009.01) | |
| H04W 52/32 | (2009.01) | |
| H04W 52/36 | (2009.01) | |
| H04W 52/40 | (2009.01) | |
| H04W 52/24 | (2009.01) | |

(52) U.S. Cl.
CPC ....... *H04W 52/146* (2013.01); *H04W 52/325* (2013.01); *H04W 52/367* (2013.01); *H04W 52/40* (2013.01); *H04W 52/241* (2013.01)

(58) Field of Classification Search
CPC . H04W 52/146; H04W 52/40; H04W 52/367; H04W 52/325; H04W 52/241
USPC .......................................... 370/252
See application file for complete search history.

(56) References Cited

U.S. PATENT DOCUMENTS

| | | |
|---|---|---|
| 6,963,753 B1 | 11/2005 | Hamabe |
| 7,197,021 B2 | 3/2007 | Sec et al. |
| 2011/0286398 A1* | 11/2011 | Chung .................. H04B 7/022 370/328 |

(Continued)

FOREIGN PATENT DOCUMENTS

WO    WO 2013051987 A1 *    4/2013    .......... H04W 52/286

*Primary Examiner* — Mang Hang Yeung
(74) *Attorney, Agent, or Firm* — Sage Patent Group (57) ABSTRACT

The disclosure relates to a method (20) for maintaining uplink time alignment performed in a network node (12) of a communication system (10) comprising a first reception point (35) and a second reception point (36). The network node (12) is configured to control the first reception point (35) and configured to serve a communication device (14). The method (20) comprises determining (21) transmit power of the communication device (14) based on signaling from the communication device (14) received in the second reception point (36), while meeting a criterion enabling performing of an uplink time alignment measurement towards the first reception point (35). The disclosure also relates to corresponding network node, computer program and computer program product.

15 Claims, 2 Drawing Sheets

(56) References Cited

U.S. PATENT DOCUMENTS

| | | | |
|---|---|---|---|
| 2012/0002580 A1* | 1/2012 | Nakashima | H04W 52/42 370/311 |
| 2012/0322494 A1 | 12/2012 | Zhou et al. | |
| 2013/0196707 A1 | 8/2013 | Baldemair et al. | |
| 2015/0031339 A1* | 1/2015 | Guo | H04W 48/04 455/411 |
| 2016/0142898 A1* | 5/2016 | Poitau | H04W 72/0413 370/329 |

* cited by examiner

METHOD AND MEANS FOR MAINTAINING UPLINK TIME ALIGNMENT

TECHNICAL FIELD

The technology disclosed herein relates generally to the field of wireless communication systems using coordinated multipoint, and in particular to timing measurements in such systems using uplink coordinated multipoint reception.

BACKGROUND

A wireless communication system covers a geographical area which is divided into several radio coverage areas. Such radio coverage areas are often referred to as cells or sectors. Each radio coverage area is served by a radio base station (RBS), which may be denoted in different ways depending e.g. on radio access technology. For example, such RBS may be referred to as eNodeB or eNB for communication systems adapting to Long Term Evolution (LTE) standard. An access point (reception point/transmission point) refers to a set of co-located antennas that provide coverage to one radio coverage area. One RBS may serve one or several such radio coverage areas.

Uplink Coordinated Multi-Point (UL CoMP) is a multi-antenna technique that commonly refers to utilizing received signals from more than one reception point, when performing reception for one communication device. The signals that are received by the various reception points can be combined and processed to obtain a final received signal, whereby also signals low in strength may be received with few errors. This can be compared to the presently more conventional case, where only one reception point, i.e. the serving reception point, is used when performing reception for one communication device.

Uplink performance can be improved quite significantly by using UL CoMP, e.g. in heterogeneous (HetNet) network deployments. Apart of this gain comes from the fact that communication devices in a HetNet deployment that are served by macro RBS reception points but located quite close to a low power RBS reception point (e.g. a pico RBS reception point), can reduce their transmit power with a maintained service quality when using both the macro and pico reception points. Thereby the communication device radiates less interference towards the pico reception point.

SUMMARY

While the combined signal quality is maintained by combining the signals from all the reception points (pico and macro in the above example) that are part of the UL CoMP reception, the signal quality in the serving reception point alone can fall below acceptable signal quality levels which are needed to perform uplink measurements such as measurements for uplink time alignment. These measurements are needed since e.g. control signaling on a physical uplink control channel (PUCCH) might only be received in the serving reception point. Furthermore, if the communication device does not receive a valid timing advance (TA) command during a configured time period, it will assume it is has lost uplink synchronization and will be forced to initiate a random access procedure prior to any physical uplink shared channel (PUSCH) or PUCCH transmission. Failure to measure uplink time alignment in the serving reception point would introduce this kind of unwanted behavior.

Figure 1:
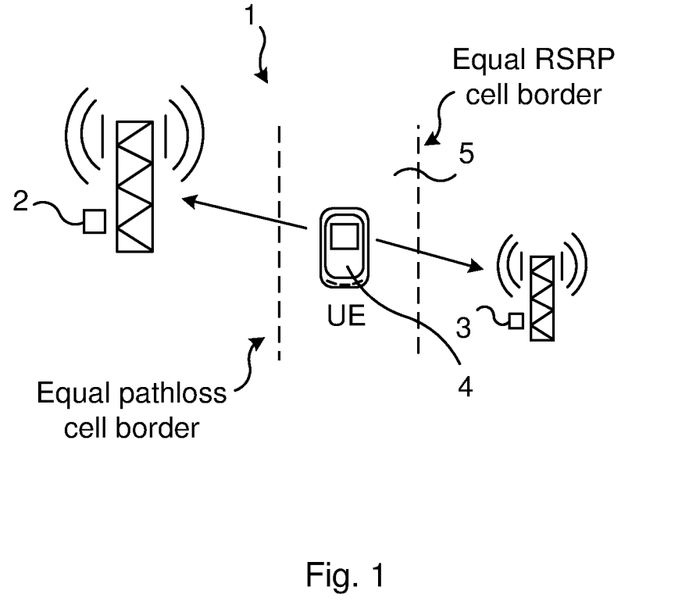
FIG. 1 illustrates an UL CoMP in a heterogeneous deployment scenario.

When UL CoMP is used, the RBS has several alternatives of controlling the transmit power of communication devices. One way is to use a predefined signal reception quality in the reception point where the highest received signal quality is achieved, and base the transmit power thereon. The reception point having the highest received signal reception quality is not necessarily the serving reception point. This may in fact be a quite frequently occurring case, especially in heterogeneous network deployments with large differences in downlink output power, as illustrated in FIG. 1. The communication system 1 comprises a macro RBS 2 and a pico RBS 3, and the macro RBS 2 is typically using higher transmit power than the pico RBS 3. An uplink signal from a communication device 4 may be received in the pico RBS 3 with a higher received signal reception quality (e.g. reference signal received power, RSRP) than in the macro RBS 2. The difference in downlink output power between the reception points 2, 3 creates a downlink/uplink imbalance which results in an area 5 in which the best serving RBS is different for uplink and downlink. For example, the cell border (as perceived by the communication device 4) between the pico RBS 3 and the macro eNB 2 based on RSRP may lead to choosing the macro RBS 2 as serving point in downlink, while the cell border based on pathloss would benefit from using the pico RBS 3 for uplink.

In such deployment scenarios, the transmit power control scheme of using a predefined signal reception quality has the benefit of ensuring that the communication device 4 does not cause high interference towards the low power pico RBS 3 while using the high power macro RBS 2 as the serving reception point, hence avoiding high interference from e.g. cell-edge macro communication devices towards the communication devices connected to the low power pico RBS 3.

A drawback with using this transmit power control scheme together with UL CoMP is that the uplink signal quality in the serving reception point can become degraded to the point when e.g. uplink time alignment cannot be maintained towards the serving reception point.

An objective of the present disclosure is to solve or at least alleviate at least the above mentioned problem.

The objective is according to a first aspect achieved by a method for maintaining uplink time alignment performed in a network node of a communication system comprising a first reception point and a second reception point. The network node is configured to control the first reception point and configured to serve a communication device. The method comprises determining transmit power of the communication device based on signaling from the communication device received in the second reception point, while meeting a criterion enabling performing of an uplink time alignment measurement towards the first reception point.

The method enables the serving reception point to maintain uplink time alignment while utilizing the benefits of UL CoMP. Communication devices are ensured to receive timing advance commands, and thus do not need to re-initiate a random access procedure.

The objective is according to a second aspect achieved by a network node of a communication system for maintaining uplink time alignment. The communication system comprises a first reception point and a second reception point and the network node is configured to control the first reception point and configured to serve a communication device. The network node comprises a processor and memory, the memory containing instructions executable by the processor, whereby the network node is operative to determine transmit power of the communication device based on signaling from the communication device received in the second reception point, while meeting a criterion enabling performing of an uplink time alignment measurement towards the first reception point.

The objective is according to a third aspect achieved by a computer program for a network node of a communication system for maintaining uplink time alignment, the communication system comprising a first reception point and a second reception point, the network node being configured to control the first reception point and configured to serve a communication device. The computer program comprises computer program code, which, when run on the network node causes the network node to determine transmit power of the communication device based on signaling from the communication device received in the second reception point, while meeting a criterion enabling performing of an uplink time alignment measurement towards the first reception point.

The objective is according to a fourth aspect achieved by a computer program product comprising a computer program as above, and a computer readable means on which the computer program is stored.

The objective is according to a fifth aspect achieved by a network node comprising means for determining transmit power of the communication device based on signaling from the communication device received in the second reception point, while meeting a criterion enabling performing of an uplink time alignment measurement towards the first reception point.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As mentioned earlier, transmit power control of a communication device can be made towards the cell/sector to which the communication has the best uplink signal quality. If having this type of transmit power control in a deployment using UL CoMP, then this may lead to the serving sector loosing uplink signal quality and necessary uplink measurements, e.g. for uplink time alignment, failing. Such situation may in particular arise in a HetNet deployment using UL CoMP reception, in which there may be a large uplink/downlink unbalance as described earlier.

Briefly, the present disclosure provides, in various embodiments, a method to assure adequate timing measurements and to maintain uplink time alignment in a wireless communication system using uplink coordinated multipoint (UL CoMP) reception. Various embodiments are thus disclosed for maintaining uplink time alignment while utilizing the benefits of UL CoMP together with uplink power control.

Figure 2:
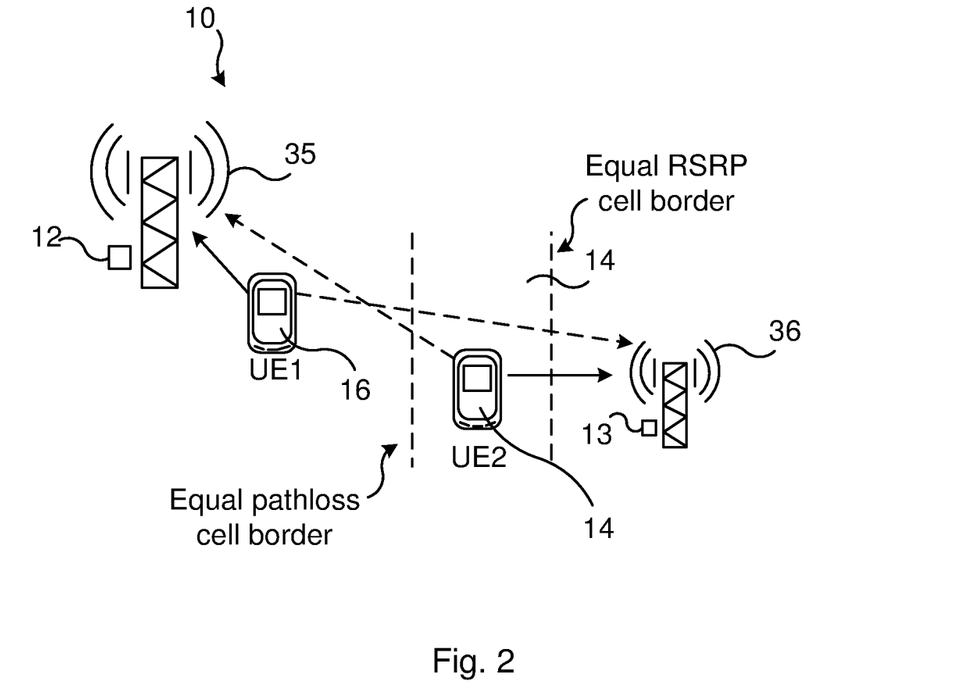
FIG. 2 illustrates schematically an environment in which embodiments of the present disclosure may be implemented.

FIG. 2 illustrates an environment in which aspects of the present disclosure may be implemented. A communication system 10, in which embodiments of the disclosure may be implemented, may be an LTE network. The communication system 10 comprises a number of network nodes 12, 13, e.g. radio base stations such as evolved Node Bs (eNBs), and also various other network entities such as network controllers, serving gateways (SGWs), mobility management entities (MMEs) etc. The eNB 12, 13 is configured to provide wireless communication for communication devices 14, 16. The communication device 14, 16 may be referred to as user equipment (UE), terminal, mobile station etc. and may for instance comprise a smart phone, a mobile phone or a laptop computer. Each network node 12, 13 may provide communication coverage for one or more geographical areas, denoted cells or sectors. The network node 12, 13, in the following referred to as RBS, is configured for uplink coordinated multipoint (UL CoMP) reception and may thus receive uplink signaling from one particular communication device 14 from several reception points. In FIG. 2 this is illustrated by arrows from the communication devices 14, 16 to two different reception points 35, 36. The reception points 35, 36 may be controlled by a single RBS 12, 13 or by different RBSs. The signaling sent from a particular communication device 14, 16 may thus be received by several reception points, and there is one serving RBS for this particular communication device 14, 16 (which of course may control all reception points with which the particular communication device communicates). The RBS serving a communication device 14, 16 is also configured to control the transmit power thereof.

In this regard, as a note of vocabulary, a reception point is typically chosen to be a serving reception point for a communication device based on downlink channel quality towards the communication device. The reception point towards which time alignment is to be maintained is typically the serving reception point.

It is noted that a particular network deployment in which embodiments of the present disclosure may be implemented comprise a HetNet scenario. The communication system 10 illustrated in FIG. 2 may then comprise a macro RBS 12 and a pico RBS 13, the macro RBS 12 being configured to use a higher transmit power than the pico RBS 13 and thus providing a larger coverage area than the pico RBS 13, which is configured to use a lower transmit power than the macro RBS 12 and reach users within a smaller coverage area.

The transmit power of the communication devices 14, 16 is typically controlled by an open loop transmit power control and a closed loop transmit power control. In an open loop power control, the communication device 14, 16 receives a reference signal from the RBS 12, 13 sent with a fixed power value and information about this fixed power value. The communication device 14, 15 measures the power of the reference signal and may determine e.g. path loss to the RBS 12, 13 and may thereby determine with which transmit power to send. In short, based on measurements of downlink received power at the communication device 14, 16, the open loop power control allows the communication device 14, 16 to select an appropriate transmit power so that the signal energy received at the serving reception point is considered good enough, i.e. such that a predefined signal reception quality is met.

The closed loop power control provides the RBS 12, 13 with the possibility to give input to the communication device 14, 16 power control mechanism to for example compensate for estimation errors in the communication device 14, 16. This is realized by sending transmit power control (TPC) commands to the communication device 14, 16. The RBS 12, 13 measures power of signals received from the communication device 14, 16, and sends TPC commands to instruct the communication device 14, 16 to increase or decrease the transmit power accordingly.

However, this latter feedback mechanism can also be used by the RBS 12, 13 to further influence the transmit power setting of the communication devices 14, 16, taking into account other considerations than the received signal energy at the serving reception point. For UL CoMP, such considerations may be that more than one reception point is used to evaluate the appropriate transmit power of the communication devices 14, 16.

One example of such a power control scheme is depicted in FIG. 2. In the following, communication devices 14, 16 illustrated in FIG. 2 are referred to as UE2 and UE1, respectively, and communication devices in general are referred to as UE. Further, a first network node 12 is referred to as macro node 12, and a second network node 13 is referred to as pico node 13. Both UE1 and UE2 are served by the macro node 12 since this decision is typically based on the received downlink RSRP in the UE. The uplink signal will be received in both the macro node 12 and the pico node 13 and the signal reception target for UE1 is maintained towards the macro node 12 since this radio link presents the best propagation path (radio link illustrated by continuous arrow between UE1 and macro node 12). Signaling from UE1 is received also by pico node 13, but this radio link (illustrated by dashed line between UE1 and pico node 13) is not as good propagation path as the radio link towards the macro node 12. UE2 is however experiencing a better propagation path towards the pico node 13 (illustrated by continuous arrow between UE2 and pico node 13) so the power reception target can be maintained towards the pico node 13 instead of the macro node 12. This means that the signal quality is maintained for UE2 by utilizing a different reception point (reception point indicated by reference numeral 36) than the serving reception point (reception point indicated by reference numeral 35). This also implies that the signal quality towards the serving reception point 35 alone could degrade to the point when uplink measurements that normally are measured in the serving reception point 35 cannot be maintained. The present disclosure provides different approaches to handle this kind of problems, i.e. approaches for maintaining uplink time alignment towards serving reception point. Thereby it is ensured that the communication devices 12, 13 may receive signaling that is sent only by the serving reception point, for example signaling enabling time alignment for the UE.

A first embodiment to maintain uplink time alignment towards the serving reception point is to make sure that the signal quality does not degrade beyond the possibilities for the serving reception point to perform adequate time alignment measurements. This may be realized by introducing a threshold, in particular a fixed power regulation threshold, that limits the degradation of the signal reception in the serving reception point when the power control algorithm tries to reduce the transmit power for the UE in relation to the reception point having the best propagation path. Such reception point, i.e. having best uplink propagation path towards a UE, is also denoted "best reception point". In particular, when the best reception point is receiving a signal quality above the predefined signal quality target, it would send a TPC to the UE to lower its transmit power. By using the fixed power regulation threshold, the best reception point is not allowed to lower the transmit power more than down to the fixed power regulation threshold, and the serving reception point will thus still be able to receive signaling from the UE or at least perform necessary measurements towards the UE, e.g. by being able to receive some signaling from the UE or by being able to make measurements on transmissions from the UE.

The fixed power regulation threshold may be set for example based on experience and/or based on simulations. The fixed power regulation threshold may in particular be set in view of the serving reception point still being able to perform time alignment measurements, for example being able to perform time alignment measurements on a particular channel.

In variations of the embodiment, the threshold may change adaptively depending on the success of carrying out the necessary measurements in the serving reception point. For example, when a successful measurement of the uplink time alignment has been carried out, the threshold value may be lowered. As another example, when a successful measurement of the uplink time alignment has been carried out, the threshold value may be removed for a while (e.g. setting it equal to zero), since the UE would have to move in relation to the serving reception point rather much before the timing advance value changes. If the movement of the UE is monitored, an indication of the need to update the time alignment may be received, whereby the fixed threshold may be re-set so that the time alignment measurements may again be carried out.

Although providing a rather simple and straightforward implementation, the above embodiment may sometimes limit the amount of interference reduction that could be achieved. In particular, the best reception point is receiving signals from the UE on a higher power level than it would actually need to do in order to hear the UE (i.e. in order to receive signals from the UE), thereby allowing the serving reception point to also hear the UE.

In a variation, the above algorithm may be used for PUSCH, so that this channel is power controlled towards all reception points while the fixed power regulation threshold is used to ensure a certain signal quality in the serving reception point. That is, the PUSCH is power controlled towards each reception point in that the transmit power target for the UE is set in relation to the best reception point among all the reception points receiving signals from the UE, but the fixed power regulation threshold is applied so that the serving reception point is able to receive signals from the UE. The PUCCH on the other hand may be power controlled only towards the serving reception point, and relies on that timing alignment is maintained properly in the serving reception point. The PUCCH is thus heard by the serving reception point since the UE sends PUCCH using sufficient power to be heard (as the UE is power controlled towards the serving reception point for this channel).

In another variation, the fixed power regulation threshold algorithm is used for power controlling both PUSCH and PUCCH.

In another embodiment, a scheduled bandwidth is limited to ensure a minimum signal quality at the serving reception point. A UE may become power limited; the UE has a maximum uplink transmit power limit (e.g. depending on the UE capability or limit provided by an RBS), and if the UE would like to use a higher uplink transmit power than this upper limit, e.g. based on RSRP, then it is prohibited to do this and it is said to be power limited.

If the UE becomes power limited, a received power spectral density (PSD) in the reception point will depend on the scheduled bandwidth. If the bandwidth is too large, the received PSD in the serving reception point could be too small for reliably measure the timing advance. In an embodiment, the allowed scheduled bandwidth is therefore limited to ensure a certain signal quality (e.g. in terms of minimum PSD) in the serving reception point when the UE becomes power limited.

If the UE becomes power limited, i.e. it cannot increase its transmit power further, then it may be allocated fewer communication resources (i.e. bandwidth). Thereby its signal power will increase in the fewer scheduled communication resources, and the received PSD is increased in the serving reception point which is then able to receive signaling from the UE. As a particular non-limiting numerical example to illustrate this, assume that the UE has a maximum transmit power of 1 W. If the UE is scheduled in 10 resource blocks (i.e. communication resources) it is thus allowed to transmit 0.1 W per resource block. However, if reducing the scheduled resource blocks by half, then it would be allowed to transmit 0.2 W per resource block of its scheduled 5 resource blocks. Such reduction of communication resources may be done during short periods of time, and may be repeated regularly or once in a while for allowing the serving reception point to receive signaling from the UE.

This embodiment may also be combined with the previous embodiments. That is, as long as the UE is not power limited, the power control algorithm is adjusted to maintain a certain signal quality in the serving reception point. If the UE is power limited, it is no longer possible to improve signal quality by increasing power, and instead the scheduled bandwidth is limited to ensure a certain signal quality.

In still another embodiment, an adaptive power regulation threshold may be used, the power regulation threshold being associated with expected changes in the UEs timing advance values.

This embodiment takes advantage of the fact that the UE can move a significant distance, i.e. a significant period of time may elapse, before a change in transmit timing advance value is detected and a new timing advance value has to be signaled to the UE. It would be possible to neglect timing measurements in the serving reception point during a period of time. During these periods of time the UE is power controlled only towards the best reception point without any consideration to its serving reception point. This allows a maximum reduction of interference towards other reception points (since the UE uses lowest possible transmit power). When there is an indication of the need for an updated uplink timing advance measurement, TPC commands is sent from the best reception point ordering the UE to increase its transmit power to a level at which uplink timing measurements becomes possible in the serving reception point.

Indications of need for an updated uplink timing advance measurement may for instance comprise the RBS determining the accuracy of the latest timing advance value for the UE, and if the accuracy is below a threshold value then that is taken as and indication of need to update the timing advance value by performing a measurement. Such an indication of the need to update the timing advance value may be realized for example by using Doppler shift to estimate the velocity of the UE. As another example, the indication of need to update the timing advance value may be realized by tracking changes of the timing advance value in the best reception point and communicating these changes to the serving point. The serving reception point may then use this information about changes in order to trigger a timing advance measurement cycle.

Further, if the UE is power limited the scheduled bandwidth may need to be reduced to ensure a certain signal quality in the serving reception point. When the measurements have been successfully concluded the power and bandwidth constraints may be released and the UE may be power controlled towards the best serving point.

In still another embodiment, adaptive uplink scheduling is used to measure timing advance on PUCCH. In such embodiment, the timing advance measurements are based on PUCCH and the PUCCH channel remains power controlled towards the serving reception point (as opposed to best reception point). In this case only the PUSCH channel will be power controlled towards the best reception point. As long as the UE is scheduled in uplink, the PUSCH channel is made to be used for all uplink transmissions including control information that are otherwise sent on PUCCH. The serving reception point may not be able to receive the PUSCH from the UE and in order to maintain the uplink synchronization towards serving reception point it is therefore important that the UE transmits on PUCCH channel when there is an indication that the timing advance value needs to be updated (such indications have been exemplified earlier). To ensure that this happens, i.e. that the UE transmits on the PUCCH when need arises, an UL scheduler may create UL scheduling gaps that are synchronized with the UE transmissions of periodic channel quality indicator (CQI) reports. With no scheduled uplink PUSCH resources the UE may then still send periodic CQI reports on PUCCH and these transmissions can be used for uplink timing advance measurements. It is noted that the content of the CQI report as such is unimportant for the purpose of determining the timing advance. However, since the UE is required to send the CQI-report regularly, and by forcing the UE to send it on the PUCCH (which is power controlled towards the serving reception point), a timing advance value can be determined towards the serving reception point based on received timing of the CQI-report.

Stated differently, PUCCH is power controlled towards the serving reception point and PUSCH is power controlled towards the best reception point. By introducing the gaps in the UL PUSCH scheduling, in which gaps the UE sends CQI reports on the PUCCH, the timing advance measurements to the serving reception point are enabled.

Figure 3:
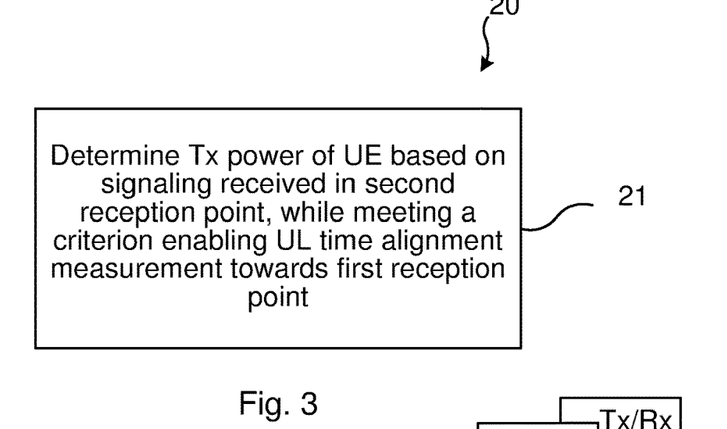
FIG. 3 illustrates a flow chart over steps of a method in a network node in accordance with the present disclosure.

The various embodiments and features may be combined in a number of ways. FIG. 3 illustrates a flow chart over steps of a method in a network node 12, 13 in accordance with the present disclosure. The method 20 for maintaining uplink time alignment may be performed in 12 of a communication system 10, such as described in relation to FIG. 2. That is the communication system 10 comprising a first reception point 35 and a second reception point 36 and the network node 12 being configured to control the first reception point 35 and configured to serve a communication device 14. The method 20 comprises determining 21 transmit power of the communication device 14 based on signaling from the communication device 14 received in the second reception point 36, while meeting a criterion enabling performing of an uplink time alignment measurement towards the first reception point 35. The transmit power may thus be controlled towards the best reception point, whereby interference reduction is achieved. The transmit power is however determined such that it is ensured that the first reception point (e.g. being the serving reception point) may still be able to perform time alignment measurements, i.e. under this requirement. This requirement is ensured by determining the transmit power while simultaneously fulfilling a criterion, which may be chosen among several different criteria and is set such that the serving reception point can perform the necessary measurements.

It is noted that several second reception points could be used.

In an embodiment, the criterion comprises a fixed threshold and the determining 21 comprises determining the transmit power based on a signal quality indicator for the signaling from the communication device 14 received in the second reception point 36 while keeping the transmit power such that signal quality indicator for the signaling received in the second reception point 36 is above the fixed threshold value.

In a variation of the above embodiment, the fixed threshold value comprises a minimum value of a signal quality indicator for the signaling from the communication device 14 to be receivable by the first reception point 35. The fixed threshold may thus be set so that the signal quality, e.g. received power, of the signaling received in the second reception point 36 is (just) high enough to be heard also by the first (i.e. serving) reception point 35.

In variations of the above two embodiments, the signaling comprises a physical uplink shared channel, PUSCH, and/or physical uplink control channel, PUCCH, and wherein the determining 21 is based on the physical uplink shared channel, PUSCH, and/or physical uplink control channel, PUCCH.

In an embodiment, the determining 21 comprises:
detecting accuracy of a timing advance adjustment towards the first reception point 35 falling below a set threshold, and
increasing the transmit power until reaching a minimum value of a signal quality indicator for the signaling from the communication device 14 to be receivable by the first reception point 35 or increasing transmit power until obtaining an accuracy of the timing advance adjustment above the set threshold.

In an embodiment, the determining 21 comprises:
detecting accuracy of a timing advance adjustment towards the first reception point 35 falling below a set threshold, and
reducing the number of communication resources allocated to the communication device 14 until a minimum value of a signal quality indicator for the signaling from the communication device 14 to be receivable by the first reception point 35 is obtained or until an accuracy of the timing advance adjustment above the set threshold is obtained.

In an embodiment, the determining 21 comprises determining a first transmit power for transmission of a physical uplink control channel, PUCCH, based on the PUCCH received in the first reception point 35 and determining a second transmit power for transmission of a physical uplink shared channel, PUSCH, based on the PUSCH received in the second reception point 36, the method 20 further comprising:
scheduling PUSCH with a scheduling gap coinciding with a scheduled channel quality indicator, CQI, report, whereby the CQI report is sent on the PUCCH.

In a variation of the above embodiment, the uplink alignment measurement is performed based on the reception of the CQI report in the first reception point 35.

In variations of the above two embodiments, the scheduling is performed upon detecting a need of the communication device 14 for an updated timing advance value.

In an embodiment, the method 20 comprises:
establishing that the communication device 14 is power limited, and
reducing the number of communication resources allocated to the communication device 14.

In an embodiment, the method 20 comprises transmitting a transmit power command to the communication device 14 based on the determined transmit power.

Figure 4:
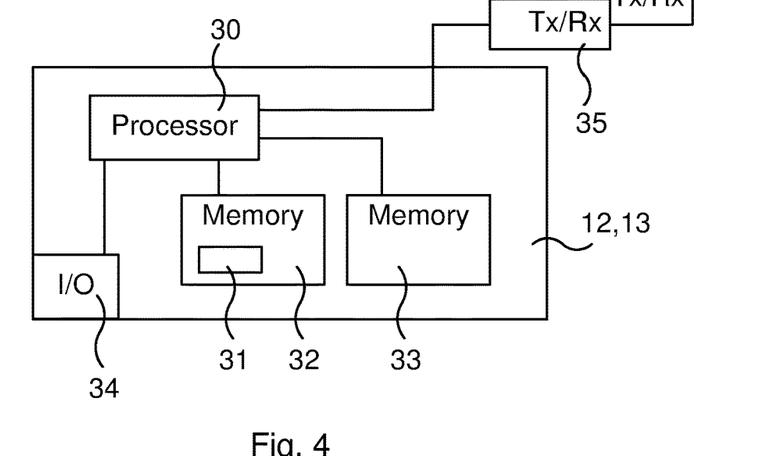
FIG. 4 illustrates schematically a network node and means for implementing methods of the present disclosure.

FIG. 4 illustrates schematically a network node and means for implementing methods of the present disclosure. The network node 12, 13 in which the present method may be implemented has been described in relation to FIG. 2, and reference is also made to the description relating to FIG. 2. The network node 12, 13 is configured for CoMP, and at least configured for UL CoMP, and it thus comprises or is arranged to control a number of reception points 35, 36.

The network node 12, 13 may further comprise an interface device, in the figure indicated by an input/output device (I/O) 34 for communicating with other network entities, e.g. to communicate with other network nodes.

The network node 12, 13 comprises a processor 30 comprising any combination of one or more of a central processing unit (CPU), multiprocessor, microcontroller, digital signal processor (DSP), application specific integrated circuit etc. capable of executing software instructions stored in a memory 32, which can thus be a computer program product 32.

The memory 32 can be any combination of read and write memory (RAM) and read only memory (ROM). The memory 32 also comprises persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can be any combination of read and write memory (RAM) and read only memory (ROM).

The processor 30 can be configured to execute any of the various embodiments of the method as has been described, e.g. in relation to FIG. 3. In particular, a network node 12, 13 of a communication system 10 is provided for maintaining uplink time alignment. The communication system 10 comprises a first reception point 35 and a second reception point 36, and the network node 12 is configured to control the first reception point 35 and configured to serve a communication device 14. The network node 12 comprises a processor 30 and memory 31, the memory 31 containing instructions executable by the processor 30, whereby the network node 12 is operative to determine transmit power of the communication device 14 based on signaling from the communication device 14 received in the second reception point 36, while meeting a criterion enabling performing of an uplink time alignment measurement towards the first reception point 35.

In an embodiment, the criterion comprises a fixed threshold and the network node 12 is configured to determine by determining the transmit power based on a signal quality indicator for the signaling from the communication device 14 received in the second reception point 36 while keeping the transmit power such that signal quality indicator for the signaling received in the second reception point 36 is above the fixed threshold value.

In a variation of the above embodiment, the fixed threshold value comprises a minimum value of a signal quality indicator for the signaling from the communication device 14 to be receivable by the first reception point 35.

In an embodiment, the signaling comprises a physical uplink shared channel, PUSCH, and/or physical uplink control channel, PUCCH, and wherein the network node 12 is configured to determine based on the physical uplink shared channel, PUSCH, and/or physical uplink control channel, PUCCH.

In an embodiment, the network node 12 is configured to determine by:
  detecting accuracy of a timing advance adjustment towards the first reception point 35 falling below a set threshold, and
  increasing the transmit power until reaching a minimum value of a signal quality indicator for the signaling from the communication device 14 to be receivable by the first reception point 35 or increasing transmit power until obtaining an accuracy of the timing advance adjustment above the set threshold.

In an embodiment, the network node 12 is configured to determine by:
  detecting accuracy of a timing advance adjustment towards the first reception point 35 falling below a set threshold, and
  reducing the number of communication resources allocated to the communication device 14 until a minimum value of a signal quality indicator for the signaling from the communication device 14 to be receivable by the first reception point 35 is obtained or until an accuracy of the timing advance adjustment above the set threshold is obtained.

In an embodiment, wherein the network node 12 is configured to determine by determining a first transmit power for transmission of a physical uplink control channel, PUCCH, based on the PUCCH received in the first reception point 35 and determining a second transmit power for transmission of a physical uplink shared channel, PUSCH, based on the PUSCH received in the second reception point 36, the network node 12 being configured to:
  schedule PUSCH with a scheduling gap coinciding with a scheduled channel quality indicator, CQI, report, whereby the CQI report is sent on the PUCCH.

In a variation of the above embodiment, the network node 12 is configured to perform the uplink alignment measurement based on the reception of the CQI report in the first reception point 35.

In variation of the above two embodiments, the network node 12 is configured to perform the scheduling upon detecting a need of the communication device 14 for an updated timing advance value.

In an embodiment, the network node 12 is configured to:
  establish that the communication device 14 is power limited, and
  reduce the number of communication resources allocated to the communication device 14.

In an embodiment, the network node 12 is configured to transmit a transmit power command to the communication device 14 based on the determined transmit power.

The present disclosure also encompasses a computer program product 32 comprising a computer program 31 for implementing the methods as described, and a computer readable means on which the computer program 31 is stored.

The computer program product 32 may be any combination of read and write memory (RAM) or read only memory (ROM). The computer program product 32 may also comprise persistent storage, which for example can be any single one or combination of magnetic memory, optical memory or solid state memory.

The present teachings thus also encompass a computer program 31 for a network node 12 of a communication system 10 for maintaining uplink time alignment, the communication system 10 comprising a first reception point 35 and a second reception point 36, the network node 12 being configured to control the first reception point 35 and configured to serve a communication device 14. The computer program 31 comprises computer program code, which, when run on the network node 12 causes the network node 12 to determine transmit power of the communication device 14 based on signaling from the communication device 14 received in the second reception point 36, while meeting a criterion enabling performing of an uplink time alignment measurement towards the first reception point 35.

The computer program product, or the memory, thus comprises instructions executable by the processor. Such instructions may be comprised in a computer program, or in one or more software modules or function modules.

Figure 5:
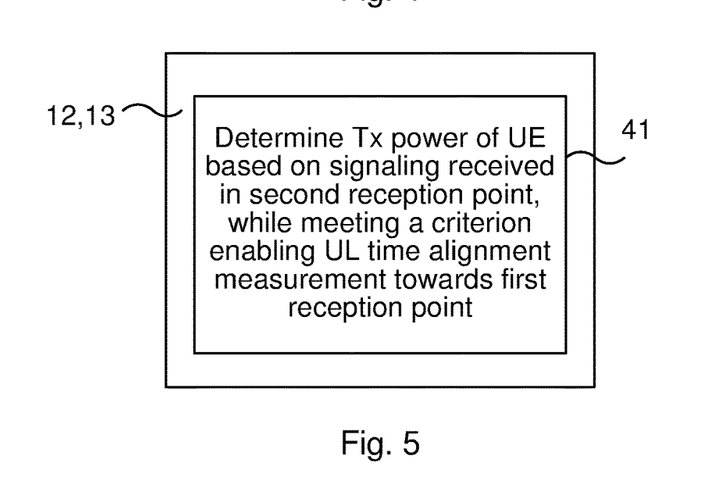
FIG. 5 illustrates a network node comprising functions modules/software modules for implementing methods of the present disclosure.

An example of an implementation using function modules/software modules is illustrated in FIG. 5, in particular illustrating the network node 12 comprising function modules for implementing methods of the present disclosure. The network node 12 comprises means, e.g. a first function module 41, for determining transmit power of the communication device 14 based on signaling from the communication device 14 received in the second reception point 36, while meeting a criterion enabling performing of an uplink time alignment measurement towards the first reception point 35. Further means, e.g. function modules, may be provided for implementing the various other features and embodiments that have been described.

The means, e.g. the function module 41, and further means, e.g. further function modules, can be implemented using software instructions such as computer program executing in a processor and/or using hardware, such as application specific integrated circuits, field programmable gate arrays, discrete logical components etc.

The present disclosure provides a number of advantages. UL CoMP is an attractive feature and more and more operators will use this type of functionality to manage the interference situation in their radio network when the traffic load increases. UL CoMP reception will also be an important functionality, particularly when introducing heterogeneous network deployments providing the freedom to basically receive the uplink signal in any reception point, not only in the serving reception point. The present disclosure addresses problems that might arise when trying to achieve the gains that can be expected when using UL CoMP. In particular, the present disclosure provides, in various embodiments, a method that will maintain proper time alignment measurements while using an uplink power control scheme based on signaling from best reception point. This will allow for e.g. simplified heterogeneous network deployments, improved utilization of the UL CoMP reception functionality, system throughput gains by reducing the interference situation in the network and improved cell edge performance experience in low power nodes by reducing the transmit power for UEs connected to high power nodes.

The disclosure has mainly been described herein with reference to a few embodiments. However, as is appreciated by a person skilled in the art, other embodiments than the particular ones disclosed herein are equally possible within the scope of the disclosure, as defined by the appended patent claims.

The invention claimed is:

1. A method of maintaining uplink time alignment performed in a network node of a communication system, the communication system comprising a first reception point and a second reception point, the network node configured for uplink coordinated multipoint reception, UL CoMP, and to control the first reception point and to serve a communication device, the method comprising:
   determining, by a function module of the network node, transmit power of the communication device based on signaling from the communication device received in the second reception point, while meeting a criterion enabling performing of an uplink time alignment measurement towards the first reception point, wherein the determining comprises:
   detecting that an accuracy of a timing advance adjustment towards the first reception point falls below a set threshold: and
   increasing the transmit power until at least one of:
   reaching a minimum value of a signal quality indicator for the signaling from the communication device to be receivable by the first reception point, or
   obtaining an accuracy of the timing advance adjustment above the set threshold.

2. The method of claim 1, wherein the determining transmit power of the communication device comprises:
   detecting that an accuracy of a timing advance adjustment towards the first reception point falls below a set threshold; and
   reducing the number of communication resources allocated to the communication device until at least one of:
   obtaining a minimum value of a signal quality indicator for the signaling from the communication device to be receivable by the first reception point;
   obtaining an accuracy of the timing advance adjustment above the set threshold.

3. The method of claim 1,
   wherein the determining transmit power of the communication device comprises:
   determining a first transmit power for transmission of a physical uplink control channel (PUCCH) based on the PUCCH received in the first reception point; and
   determining a second transmit power for transmission of a physical uplink shared channel (PUSCH) based on the PUSCH received in the second reception point further comprising scheduling the PUSCH with a scheduling gap coinciding with a scheduled channel quality indicator (CQI) report, whereby the CQI report is sent on the PUCCH.

4. The method of claim 3, wherein the uplink time alignment measurement is performed based on the reception of the CQI report in the first reception point.

5. The method of claim 3, wherein the scheduling is performed upon detecting a need of the communication device for an updated timing advance value.

6. The method of claim 1, further comprising:
   establishing that the communication device is power limited; and
   reducing the number of communication resources allocated to the communication device.

7. The method of claim 1, further comprising:
   transmitting a transmit power command to the communication device based on the determined transmit power.

8. A network node for maintaining uplink time alignment, the network node being part of a communication system, the communication system comprising a first reception point and a second reception point, the network node configured for uplink coordinated multipoint reception, UL CoMP, and to control the first reception point and to serve a communication device, the network node comprising:
   a processor;
   memory containing instructions executable by the processor whereby the network node is operative to:
   determine transmit power of the communication device based on signaling from the communication device received iii the second reception point, while meeting a criterion enabling performing of an uplink time alignment measurement towards the first reception point, wherein the network node comprising a function module being configured to determine the transmit power of the communication device by
   detecting that an accuracy of a timing advance adjustment towards the first reception point fails below a set threshold: and
   increasing the transmit power until at least one of:
   reaching a minimum value of a signal quality indicator for the signaling from the communication device to be receivable by the first reception point;
   obtaining an accuracy of the timing advance adjustment above the set threshold.

9. The network node of claim 8, wherein the instructions are such that the network node is configured to determine by:
   detecting that an accuracy of a timing advance adjustment towards the first reception point falls below a set threshold;
   reducing the number of communication resources allocated to the communication device until at least one of:
   obtaining a minimum value of a signal quality indicator for the signaling from the communication device to be receivable by the first reception point;
   obtaining an accuracy of the timing advance adjustment above the set threshold.

10. The network node of claim 8, wherein the instructions are such that the network node is configured to:
    perform the determining by:
    determining a first transmit power for transmission of a physical uplink control channel (PUCCH) based on the PUCCH received in the first reception point;
    determining a second transmit power for transmission of a physical uplink shared channel (PUSCH) based on the PUSCH received in the second reception point;
    schedule the PUSCH with a scheduling gap coinciding with a scheduled channel quality indicator (CQI) report, whereby the CQI report is sent on the PUCCH.

11. The network node of claim 10, wherein the instructions are such that the network node is configured to perform the uplink alignment measurement based on the reception of the CQI report in the first reception point.

12. The network node of claim 10, wherein the instructions are such that the network node is configured to perform the scheduling the PUSCH upon detecting a need of the communication device for an updated timing advance value.

13. The network node of claim 8, wherein the instructions are such that the network node is configured to:
    establish that the communication device is power limited; and
    reduce a number of communication resources allocated to the communication device.

14. The network node of claim 8, wherein the instructions are such that the network node is configured to transmit a transmit power command to the communication device based on the determined transmit power.

15. A computer program product stored in a non-transitory computer readable medium for maintaining uplink time alignment by a network node of a communication system, the communication system comprising a first reception point and a second reception point, the network node configured for uplink coordinated multipoint reception, UL CoMP, and to control the first reception point and to serve a communication device, the computer program product comprising software instructions which, when run on one or more processors of the network node, causes the network node to:
- determine, by a function module of the network node, transmit power of the communication device based on signaling from the communication device received in the second reception point, while meeting a criterion enabling performing of an uplink time alignment measurement towards the first reception point, wherein the function module is configured to determine transmit power of the communication device comprising:
- detecting that an accuracy of a timing advance adjustment towards the first reception point falls below a set threshold: and
- increasing the transmit power until at least one of:
- reaching a minimum value of a signal quality indicator for the signaling from the communication device to be receivable by the first reception point:
- obtaining an accuracy of the tinning advance adjustment above the set threshold.

* * * * *